US012712117B2

(12) United States Patent
Laemmle et al.

(10) Patent No.: US 12,712,117 B2
(45) Date of Patent: Aug. 18, 2026

(54) FLAT COIL CARRIER

(71) Applicant: Mahle International GmbH, Stuttgart (DE)

(72) Inventors: Christopher Laemmle, Stuttgart (DE); Johannes Liebertseder, Karlsruhe (DE); Andreas Menrath, Karlsruhe (DE); Felix Schmidt, Weingarten (DE); Holger Schroth, Maulbronn (DE); Markus Watzlawski, Esslingen (DE)

(73) Assignee: Mahle International GmbH (DE)

( * ) Notice: Subject to any disclaimer, the term of this patent is extended or adjusted under 35 U.S.C. 154(b) by 1224 days.

(21) Appl. No.: 17/013,521

(22) Filed: Sep. 4, 2020

(65) Prior Publication Data

US 2021/0076458 A1 Mar. 11, 2021

(30) Foreign Application Priority Data

Sep. 6, 2019 (DE) ......................... 102019213598.6

(51) Int. Cl.
*H01F 27/28* (2006.01)
*H01F 17/00* (2006.01)
(Continued)

(52) U.S. Cl.
CPC ....... *H01F 27/2871* (2013.01); *H01F 27/306* (2013.01); *H01F 41/04* (2013.01);
(Continued)

(58) Field of Classification Search
CPC ........ H01F 27/06; H01F 27/30; H01F 27/306; H01F 5/02; H05B 3/68; H05B 6/36; H05B 6/362
See application file for complete search history.

(56) References Cited

U.S. PATENT DOCUMENTS 2,488,391 A * 11/1949 Ford ........................ H01F 27/25 336/215
3,518,596 A * 6/1970 Connell .................... H01F 5/04 29/605

(Continued)

FOREIGN PATENT DOCUMENTS

CN 1188566 A 7/1998
CN 1433032 A 7/2003

(Continued)

OTHER PUBLICATIONS

German Search Reported dated Aug. 31, 2020 for copending German Application No. 102019213598.6.

(Continued)

*Primary Examiner* — Jack Chiang
*Assistant Examiner* — Aric Lin
(74) *Attorney, Agent, or Firm* — Fishman Stewart PLLC

(57) ABSTRACT

A flat coil carrier may include a carrier body. The carrier body may include, on an axial front side, a groove spiral configured to receive a coil wire. The groove spiral may have an axially open groove opening and may include a plurality of radially consecutive groove sections. The plurality of radially consecutive groove sections may each have an axially open groove section opening of a plurality of groove section openings. The plurality of radially consecutive groove sections may each be separated from one another by a common separating wall section of a plurality of separating wall sections of the carrier body. At least one of the plurality of separating wall sections may protrude from the carrier body and may have at least one undercut section including a radially protruding protrusion such that an undercut for the coil wire is formed in the at least one undercut section.

19 Claims, 4 Drawing Sheets

(51) Int. Cl.
*H01F 17/04* (2006.01)
*H01F 27/30* (2006.01)
*H01F 41/04* (2006.01)
*H01F 41/12* (2006.01)

(52) U.S. Cl.
CPC ... *H01F 41/122* (2013.01); *H01F 2017/0073* (2013.01); *H01F 2017/046* (2013.01)

(56) References Cited

U.S. PATENT DOCUMENTS

| | | | | |
|---|---|---|---|---|
| 5,638,039 | A | 6/1997 | Lehmann et al. | |
| 5,935,471 | A * | 8/1999 | St. Louis | H05B 3/16 219/465.1 |
| 6,842,101 | B2 | 1/2005 | Maguire et al. | |
| 11,170,922 | B2 | 11/2021 | Nishimura | |
| 2015/0053773 | A1 * | 2/2015 | Hsu | H01Q 7/00 235/492 |
| 2015/0060929 | A1 | 3/2015 | Lai | |
| 2015/0097646 | A1 | 4/2015 | Park et al. | |
| 2019/0006094 | A1 * | 1/2019 | Furiya | H01F 27/06 |
| 2019/0006826 | A1 * | 1/2019 | Islinger | H02G 3/0418 |
| 2019/0333693 | A1 * | 10/2019 | Nishimura | H01F 27/2823 |
| 2020/0198483 | A1 | 6/2020 | Laemmle et al. | |

FOREIGN PATENT DOCUMENTS

| | | | |
|---|---|---|---|
| CN | 202310166 | U * | 7/2012 |
| CN | 202551397 | U * | 11/2012 |
| CN | 103634958 | A | 3/2014 |
| CN | 203850083 | U | 9/2014 |
| CN | 104219809 | A * | 12/2014 |
| CN | 204119639 | U | 1/2015 |
| CN | 104517710 | A | 4/2015 |
| CN | 106128719 | A | 11/2016 |
| CN | 109313975 | A | 2/2019 |
| CN | 109633224 | A | 4/2019 |
| CN | 110087357 | A | 8/2019 |
| DE | 10 2017 207 266 | A1 | 10/2018 |
| EP | 0645786 | B1 | 1/1998 |
| GB | 268007 | A | 3/1927 |
| JP | 2004310502 | A | 11/2004 |
| JP | 2017017874 | A * | 1/2017 |
| TW | 201637040 | A | 10/2016 |
| WO | WO-2017054215 | A1 * | 4/2017 |

OTHER PUBLICATIONS

Chinese Search Report dated Dec. 28, 2021 for copending Chinese App. No. 2020109134191.1 (with English translation).

Chinese Office Action dated Jan. 18, 2022 for copending Chinese App. No. 202010913419.1 (with English translation).

Ishihara et al., "Production of Glassy Coil Springs by Warm Coiling of Zr-based Glassy Alloy Wires," Materials Transactions, 20014, vol. 45, No. 8, pp. 2788-2790.

* cited by examiner

FLAT COIL CARRIER

CROSS-REFERENCE TO RELATED APPLICATIONS

This application claims priority to German Patent Application No. DE 10 2019 213 598.6, filed on Sep. 6, 2019, the contents of which is hereby incorporated by reference in its entirety.

TECHNICAL FIELD

The present invention relates to a flat coil carrier comprising a carrier body, which has a spirally running groove spiral for receiving a coil wire of a flat coil. The invention furthermore relates to a flat coil of this type. The invention moreover relates to a method for producing a flat coil carrier of this type by means of injection molding and an injection molding tool for producing a coil carrier of this type.

BACKGROUND

A flat coil has a coil winding running spirally essentially in one plane. The coil winding usually consists of a coil wire, which is received in a coil carrier of the flat coil. Flat coils of this type can be used in any applications. Flat coils of this type are used in particular as high-performance flat coils in response to the inductive charging of an electrical energy carrier, for example in a motor vehicle.

The use of a flat coil of this type in an induction charging device for a motor vehicle is known from DE 10 2017 207 266 A1. The coil carrier of the flat coil has a groove spiral, which runs spirally on a front side of a carrier body and which is axially open and in which the coil wire is received.

The use of flat coils requires a precise and predetermined arrangement of the coil wire in the carrier body, and thus a precise and predetermined formation of the flat coil, in order to be able to in particular reach electrical specifications. This is why flat coils known from the prior art are usually assembled directly at the application site, and the coil wire received in the groove spiral is fixed in use for example by means of a frontal attachment of an axially adjacent component in order to prevent an axial and/or radial and unintentional displacement of the coil wire. This leads to a more complicated production of the flat coil as well as of the corresponding application. A preassembly of the flat coil is in particular not possible in this way or is at least significantly more complicated.

SUMMARY

The present invention thus deals with the object of specifying improved or at least other embodiments for a flat coil carrier of a flat coil as well as for a flat coil of this type and for a method as well as for an injection molding tool for producing a flat coil carrier of this type, which are characterized in particular by a simplified production and/or increased quality during operation of the flat coil.

According to the invention, this object is solved by means of the subject matter of the independent claim(s). Advantageous embodiments are subject matter of the dependent claim(s).

The present invention is based on the general idea of providing a groove spiral of a flat coil carrier for a flat coil, which serves to receive a coil wire of the flat coil, with at least one undercut, in which the coil wire is received and which thus axially fixes the coil wire in a positive manner in the groove spiral in the area of the undercut, so that an axial movement of the coil wire in the area of the undercut is prevented or at least significantly reduced. As a result, a predetermined positioning of the coil wire in the flat coil carrier is possible more easily, so that the production of the flat coil and the use in a corresponding application, for example in an induction charging device for inductively charging an energy storage, for example in a motor vehicle, can take place more easily. Moreover, the coil wire is arranged in the flat coil carrier with an increased precision, so that the electromagnetic field generated by means of the flat coil, in particular magnetic field, can be generated more precisely. An increased precision and quality of the flat coil is thus attained. Moreover, the flat coils can thus already be prefabricated prior to the use in the corresponding application, the coil wire can in particular already be arranged prior to this use in the flat coil carrier. The flat coil can thus be preassembled more easily, which also provides for the preassembly in large quantities, in particular in large-scale production. This leads to a further simplification of the production of the flat coil and of the assembly of the flat coil in the corresponding application.

In accordance with the idea of the invention, the flat coil carrier has a carrier body. In order to receive the coil wire on an axial front side, the carrier body has a groove spiral, which has a groove opening, which is open in an axial direction and which extends spirally on the carrier body transversely to the axial direction in the manner of a flat spiral. The extension of the groove spiral is such that radially consecutive groove sections of the groove spiral are formed. The respective groove section thereby has an axially open groove section opening. To produce the flat coil, the insertion and/or winding of the coil wire takes place through the groove opening and the respective groove section opening. The radially consecutive groove sections are in each case separated from one another by means of a common separating wall section of the carrier body. In other words, the groove spiral is in each case radially defined by two separating walls of the carrier body, which run spirally, following the course of the groove spiral. The separating walls and thus the separating wall sections, thereby protrude, in particular axially, from the carrier body. According to the invention, at least one of the separating wall sections, which protrudes from the carrier body, has, in a section, hereinafter also referred to as undercut section, a radially protruding protrusion, which radially reduces the corresponding groove section opening of the corresponding groove section, so that an undercut for the coil wire is formed in the undercut section.

The groove spiral runs spirally around a center. In this case, the axial direction is defined in particular by the axis of the spirally running groove spiral, wherein the axis runs through the center. The directions indicated below refer to the axial direction or are to be understood relative to this axial direction, respectively.

The flat coil carrier can generally have a single protrusion of this type, which extends along the entire groove spiral or a significant portion of the extension of the groove spiral, so that the groove spiral has an undercut, which is essentially continuous along the groove spiral. In this case, the expression "along the groove spiral" means following the spiral course of the spiral.

In the case of preferred embodiments, the flat coil carrier has at least two undercut sections of this type, which are spaced apart from one another along the groove spiral by means of separating sections, wherein the separating sections are free from undercuts. This simplifies the production of the flat coil carrier as well as the introduction of the coil wire into the groove spiral. As a result, the prefabrication of the flat coil and/or the use of the flat coil are also simplified in the corresponding application.

The groove spiral can generally have any course.

The groove spiral preferably has a rectangular basic layout comprising consecutive longitudinal sides, which in each case run essentially tangentially, that is, essentially tangentially to a fictious circle, around the center. The longitudinal sides thereby transition into one another via corner sections of the groove spiral, which preferably have a curved course. The groove spiral thus runs spirally around the center, through which the axis runs as well, with a rectangular basic layout and curved corner sections. In other words, the rectangular basic form has curved corners.

The undercut sections, which are spaced apart from one another, can generally be arranged relative to one another in any way.

Embodiments, in the case of which the undercut sections are combined to form undercut segments, which extend radially and which are separated from one another by means of separating segments, which extend radially and which are free from undercuts, are considered to be advantageous. The respective undercut segment thus has radially consecutive undercut sections. The respective separating segment, in contrast, has radially consecutive separating sections. This provides for a simplified and cost-efficient production of the flat coil carrier. Moreover, the introduction of the coil wire into the groove spiral is thus simplified, so that the production of the flat coil and the use in the corresponding application also take place in a simplified manner.

The respective protrusion can generally protrude radially from the corresponding separating wall section with any orientation.

Embodiments, in the case of which at least one of the protrusions, advantageously the respective protrusion, protrudes radially to the outside from the corresponding separating wall section and reduces the groove opening, are preferred. The respective protrusion is thus directed away from the center of the groove spiral. The respective protrusion thus reduces the groove opening on its side, which is radially closer to the center. The respective undercut is thus arranged on the side of the corresponding undercut section, which is radially closer to the center. The insertion of the coil wire into the groove spiral thus has the advantage that the coil wire is pulled or pushed, respectively, into the groove spiral or into the respective undercut, respectively, in accordance with its winding. To remove the coil wire from the groove spiral, the coil wire would need to be increased or displaced radially to the outside opposite to its winding in the areas of the protrusions, which complicates a removal of the coil wire and/or prevents the coil wire from falling out of the groove spiral, or at least reduces the corresponding risk. The coil wire is thus held in the flat coil carrier in a more stable manner and with an increased precision.

The respective protrusion can generally have any extension along the groove spiral. This means that consecutive undercuts can in each case have any extension along the groove spiral.

In the case of preferred embodiments, the extension of the protrusions and thus of the undercuts increases with radial distance of the protrusions towards the center of the groove spiral. This means that protrusions, which are arranged radially closer to the center, are shorter along the groove spiral than protrusions, which are further away from the center. The extension of the protrusions within the respective undercut segment in particular increases radially to the outside. With increasing distance from the center of the groove spiral and thus of the coil wire, the coil wire is thus fixed to the flat coil carrier in larger sections by means of the corresponding undercut sections. It is in particular considered thereby that the extension of the coil wire increases with increasing distance from the center, in particular at a corresponding angle section in the plane of the coil wire and thus of the flat coil carrier. An even and/or homogenous fixation of the coil wire in the flat coil carrier is thus attained in this way. This leads to a simple and precise production of the flat coil.

It is advantageous when the respective undercut segment extends in an angular area, which is defined by the radially running flanks of the undercut segment through the center. It is preferred thereby, when at least two of the undercut segments, advantageously all undercut segments, in each case extends/extend over a flat angle, that is, an angle of smaller than 90 degrees, particularly preferably of smaller than 60 degrees, for example 40 degrees.

The flat coil carrier advantageously has radially consecutive separating sections. The separating sections are preferably dimensioned in such a way that radially consecutive separating sections in each case have an identical extension along the groove spiral.

The longitudinal sides of the groove spiral can in each case generally run tangentially.

Embodiments are conceivable, in the case of which at least one of the longitudinal sides of the groove spiral has a curvature section, in which the longitudinal side runs with a radius of curvature and thus essentially tangentially. The radius of curvature of the respective curvature section is thereby larger than the radius of curvature of at least one of the adjacent corner areas. The radius of curvature of the curvature section is in particular between ten times and one hundred and fifty times the radius of curvature of at least one of the next adjacent corner areas. Particularly preferably, the radius of curvature of the curvature section is between fifty times and one hundred and fifty times, in particular one hundred times, the radius of curvature of at least one of the next adjacent corner areas. A slightly curved course of the undercut section and thus of the undercut and of the protrusion is attained by means of a curvature section of this type. Even in the case or larger extensions of the corresponding longitudinal side, this leads to an improved fixation of the coil wire in the axial direction.

The flat coil carrier, in particular the carrier body, can be made of any substance or material. The flat coil carrier is in particular made of plastic, preferably of a thermoplastic.

Embodiments are advantageous, in the case of which the flat coil carrier is produced by means of a forming process, in particular by means of an injection molding process.

The flat coil carrier is preferably an injection molded component. This provides for a simple and cost-efficient production of the flat coil carrier, wherein the undercuts of the flat coil carrier can be produced without undercuts in the corresponding injection molding tools. This means that the injection molding tool, in particular a lower tool part and an upper tool part, cooperate with one another in order to produce the flat coil carrier by means of a simple open-close mechanism.

A method for producing a flat coil carrier of this type accordingly also belongs to the scope of this invention, in the case of which an injection molding tool comprising an upper tool part and a lower tool part is provided. To produce the flat coil carrier, the upper tool part and the lower tool part are attached to one another without being engaged behind in such a way that they define a hollow space for producing the flat coil carrier.

It is preferred thereby when the respective tool part, that is the lower tool part and the upper tool part, for forming the respective protrusion together with undercut and groove spiral, has, in the area of the protrusion, a shoulder, which protrudes in the axial direction and thus in the direction of the other tool part in the closed state of the injection molding tool. On their sides facing one another transversely to the axial direction, in particular radially, the shoulders are flat and thus abut against one another with the flat sides and thus transversely to the axial direction. One of the shoulders, for example the shoulder of the upper tool part, is moreover spaced apart from the other tool part, for example from the lower tool part, in the axial direction, so that the hollow space extends axially and radially to the shoulder of the other tool part, in order to form the corresponding separating wall section comprising the radially protruding protrusion in response to the injection molding. The tool parts thus remain without being engaged behind and can be attached to one another and removed from one another by means of a simple open-close mechanism, wherein the tool parts are moved relative to one another in the axial direction for this purpose. This means that the tool parts can be attached to one another by means of a simple relative movement relative to one another in the axial direction, in order to close the tool for defining the hollow space and for producing the flat coil carrier. The tool parts can thus likewise be separated from one another by means of a simple relative movement in the axial direction, and the tool can thus be opened, in order to remove for example the produced flat coil carrier.

Outside of the areas of the protrusions, which are to be produced, only one of the tool parts can have a structure, which is complementary to the groove spiral and which axially protrudes in the closed state of the injection molding tool, for example with a semicircular cross section, in order to produce the groove spiral in the areas without protrusion.

The injection molding of the substance, in particular of the material, forming the flat coil carrier, for example of the thermoplastic plastic, advantageously takes place centrally by means of a ring-shaped melt distributor.

The carrier body thereby preferably has at least one, advantageously several, separating sections, which run tangentially, that is, sections without protrusions and undercuts. This leads to an improved transport of the melt forming the flat coil carrier in response to the production in the injection molding process and thus to an increased quality and/or a simplified production of the flat coil carrier. An arrangement of this type of the free sections furthermore leads to an increased mechanical stability, in particular to an improved flexural strength of the flat coil carrier. The increased mechanical stability of the flat coil carrier leads to a simplified production of the flat coil and/or simplified use of the flat coil in the corresponding application.

It goes without saying that, in addition to the flat coil carrier, the method for producing the flat coil carrier as well as the injection molding tool in each case likewise belong to the scope of this invention.

It further goes without saying that a flat coil comprising the flat coil carrier also belongs to the scope of this invention. In addition to the flat coil carrier, the flat coil has the coil wire, which is received in the groove spiral, and is fixed axially to the flat coil carrier in a positive manner in the at least one undercut section.

The coil wire advantageously has a diameter, which allows for an introduction of the coil wire into the groove spiral. In the cross section, the coil wire in particular has a diameter, which is smaller than the radial extension of the groove opening in the area of the protrusions, that is, a radial extension of the groove section opening of the at least one undercut section.

Embodiments are preferred, in the case of which the coil wire is fixed to the coil carrier on at least one longitudinal side. A movement of the coil wire along the groove spiral is also prevented or at least reduced in this way, so that the production of the flat coil and/or the use in the corresponding application is further simplified and improved.

To fix at least one of the longitudinal end sides of the coil wire, the coil carrier can be designed accordingly. In the area of the longitudinal end side, the coil carrier can form, for example, a positive connection, in particular a clamp connection, with the coil wire, which fixes the coil wire to the flat coil carrier along the groove spiral. For this purpose, the flat coil carrier can have a clamp and the like for clamping the corresponding longitudinal end side of the coil wire.

The flat coil according to the invention is used in any application.

The flat coil can in particular be used in an inductive charging assembly for inductively charging an electrical energy storage. The charging assembly can in particular be used for inductively charging an energy storage of a motor vehicle.

Further important features and advantages of the invention result from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
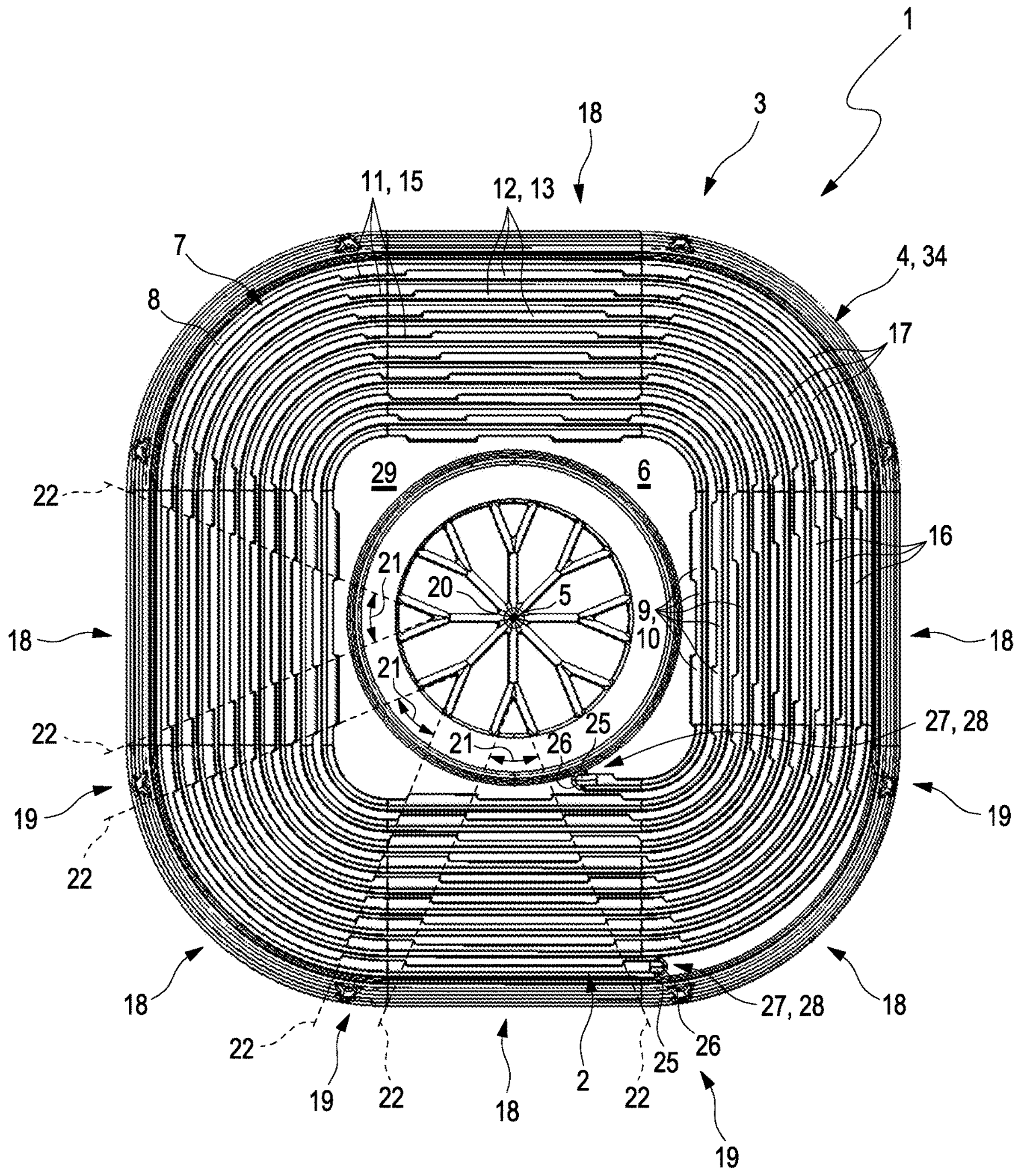
FIG. 1 shows a top view onto a flat coil.

A flat coil 1, as it is shown, for example, in FIGS. 1 to 4, has a coil wire 2, which runs in a spiral and flat manner, which is received in a carrier 3, hereinafter also referred to as flat coil carrier 3, of the flat coil 1. The flat coil carrier 3 has a carrier body 4, which is formed in a plate-shaped manner. The carrier body 4 extends essentially perpendicular to an axial direction 5 in one plane. To receive the coil wire 2, the carrier body 4 has, on an axial front side 6, a groove spiral 7, which runs spirally in accordance with the course of the coil wire 2. The groove spiral 7 thus extends transversely to the axial direction 5 on the carrier body 4. The groove spiral 7 thereby has an axially open groove opening 8. Due to the spiral course of the groove spiral 7, the groove spiral 7 has radially consecutive groove sections 9, wherein the respective groove section 9 has for forms, respectively, a part of the groove opening 8, wherein this part will also be referred to below as groove section opening 10. The radially consecutive groove sections 9 are in each case separated from one another by means of a common separating wall section 11, which protrudes from the carrier body 4. In an undercut section 12, at least one of the separating wall sections 11 thereby has a radially protruding protrusion 13, which radially reduces the corresponding groove section opening 10, so that an undercut 14 (see FIG. 2) for the coil wire 2 is formed by means of the protrusion 13 in the undercut section 12.

In the shown exemplary embodiments, the carrier body 4 has several undercut sections 12 of this type, each comprising a corresponding protrusion 13, which are consecutive along the groove spiral 7, wherein consecutive undercut sections 12 are separated from one another by means of separating sections 15, which are free from protrusions 13 and/or undercuts 14.

In the shown examples, the groove spiral 7 has a rectangular basic layout comprising consecutive, at least essentially tangentially running longitudinal sides 16, wherein consecutive longitudinal sides 16 transition into one another via corner areas 17, which run in a curved manner.

In the shown examples, the flat coil carrier 3 has radially consecutive undercut sections 12, which each form an undercut segment 18. The undercut segments 18 are separated from one another by means of separating segments 19, wherein the respective separating segment 19 has radially consecutive separating sections 15. With regard to a center 20 of the groove spiral 7, the extension of the undercut sections 12 and thus of the protrusions 13 along the groove spiral 7 thereby increases with increasing radial distance. This means that radially consecutive undercut sections 12 and protrusions 13 have an increasing extension with increasing radial distance to the center 20 along the groove spiral 7. In the shown example, however, an extension of the separating sections 15 is identical. The undercut segments 18 thus in each case extend over an angular area 21, which is defined by the flanks 22 of the respective undercut segment 18, which run through the center 20 and which are illustrated by means of dashes in the figures.

In the shown examples, the undercut sections 12 and the undercut segments 18 are arranged equidistantly to one another. The undercut sections 12 and the undercut segments 18 are thereby also arranged in the corner areas 17 of the groove spiral.

Figure 2:
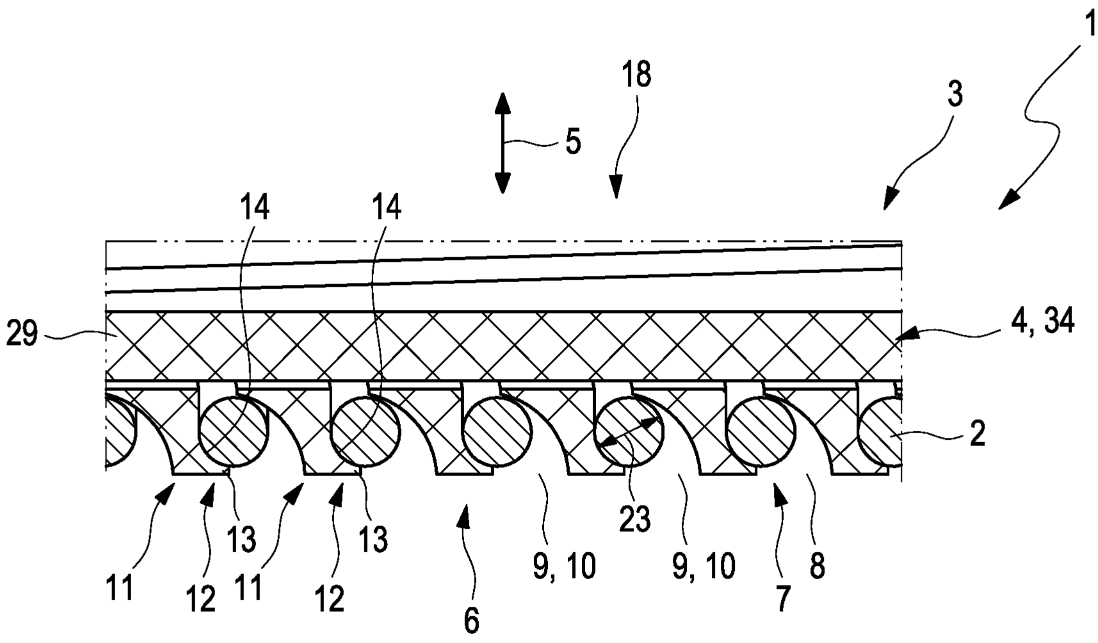
FIG. 2 shows a section through a first area of the flat coil.
Figure 3:
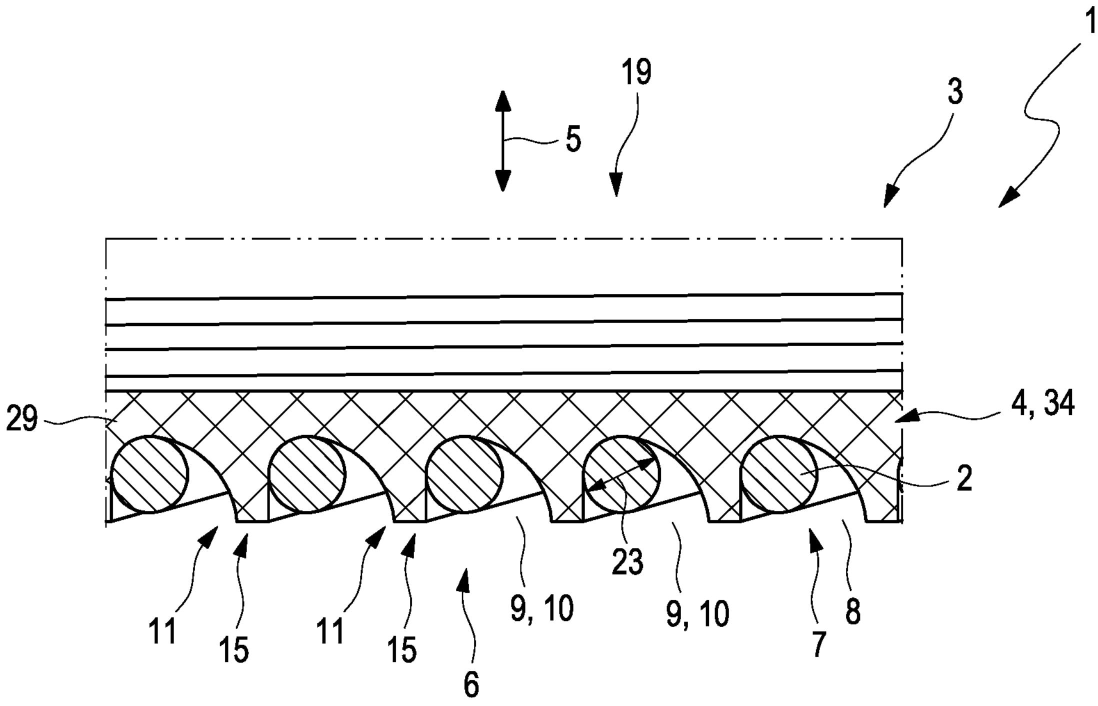
FIG. 3 shows a section through a second area of the flat coil.

A radial section through the flat coil 1 through one of the undercut segments 18 is shown in FIG. 2, and a radial section through one of the separating segments 19 is shown in FIG. 3.

As shown by a comparison of FIGS. 2 and 3, a reduction of the groove section opening 10 in the area of the protrusion 13 and thus a reduction of the groove section opening 10 in the area of the undercut section 12, and a formation of the undercut 14 is realized by means of the respective protrusion 13, as described above. The coil wire 2 is fixed in a positive manner in the axial direction 5 in the respective undercut section 12 by means of the undercut 14, so that the coil wire 2 cannot be moved out of the coil carrier 4 in the axial direction 5, in particular cannot fall out of it. As can in particular be gathered from FIG. 2, the respective protrusion 13 is formed axially on the end side of the corresponding separating wall section 11. The protrusions 13 thereby extend radially in the same direction in such a way that the groove section opening 10 in the respective undercut section 12 is reduced by only one of the protrusions 13. As further shown by a comparison of FIGS. 2 and 3, a diameter 23 of the coil wire 2 is such that the coil wire 2 can axially also be inserted into the undercut sections 12, and such that the coil wire 2 is received in the respective undercut 14 in a positive manner as described.

In the case of the exemplary embodiment shown in FIG. 1, the longitudinal sides 16 of the groove spiral 7 run tangentially.

Figure 4:
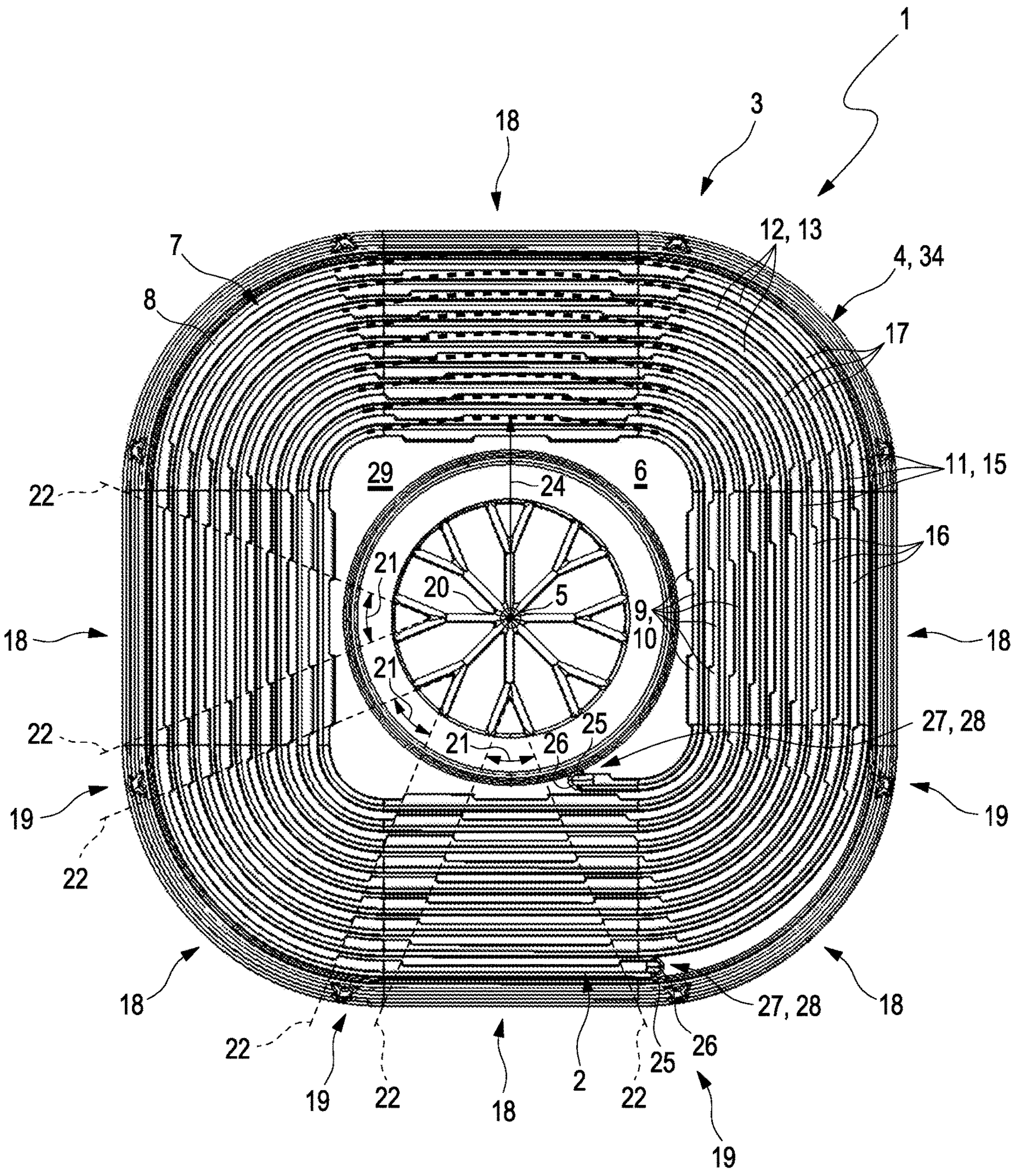
FIG. 4 shows a top view onto the flat coil in the case of another exemplary embodiment.

In the case of the exemplary embodiment shown in FIG. 4, the undercut sections 12, in particular the protrusions 13, as suggested for one of the undercut segments 18, have a curved course in the longitudinal sides 16 with a suggested radius of curvature 24, which corresponds to between ten times and one hundred and fifty times the radius of curvature of at least one of the next adjacent corner areas 17, preferably to one hundred times of both next adjacent corner areas 17. The longitudinal sides 16 thus run essentially tangentially. The radius of curvature 24 in particular increases from radially consecutive longitudinal sides 16.

In the case of the shown examples, the coil wire 2 is axially guided through the carrier body 4 on both longitudinal end sides 25. This means that the carrier body 4 has an axially running passage opening 26 for the respective longitudinal end side 25 of the coil wire 2. On the respective longitudinal end side 25, the carrier body 4 and the coil wire 2 thus form a non-positive connection 27 and/or a positive connection 28, which also fixes the coil wire 2 to the carrier boy 4 along the course of the coil wire 2.

As can be gathered from FIGS. 1 to 4, the protrusions 13 in each case protrude radially to the outside from the corresponding separating wall section 15. The protrusions 13 are thus directed away from the center 20 of the groove spiral 7, and in each case reduce the groove opening 8 on the side, which is radially close to the center 20. The respective undercut 14 is thus also arranged on the side of the corresponding undercut section 12, which is radially closer to the center 20. As can in particular be gathered from FIGS. 2 and 3, the flat coil carrier 2 is preferably of uniform material and monolithic.

The carrier body 4, in particular the flat coil carrier 3, is preferably an injection molded component 34, thus produced by means of an injection molding process, preferably of thermoplastic plastic 29.

Figure 5:
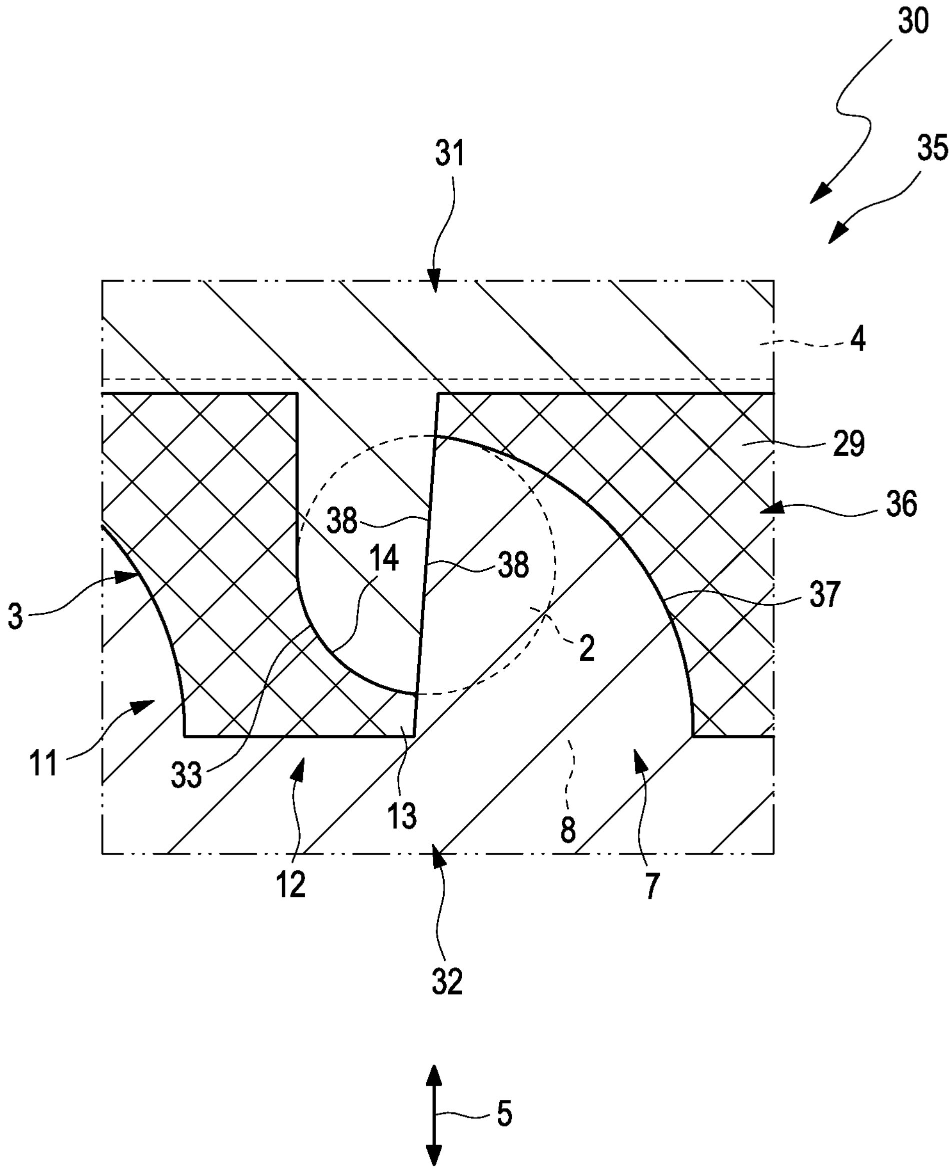
FIG. 5 shows a section through an injection molding tool for producing a flat coil carrier of the flat coil.

As can in particular be gathered from FIG. 5, this takes place with the help of an injection molding tool 30, which has an upper tool part 31 and a lower tool part 32. FIG. 5 thereby shows a section through the injection molding tool 30 in an area, in which an undercut section 12 comprising a protrusion 13 or undercut 14, respectively, are formed in response to the production, wherein the carrier body 4 as well as the coil wire 2 are illustrated in FIG. 5 for a better understanding. FIG. 5 further shows a closed state 35 of the injection molding tool 30. In the closed state 35, the tool parts 31, 32 define a hollow space 36, into which the thermoplastic plastic 29 is injected to produce the flat coil carrier 3.

To produce the respective protrusion 13 comprising the corresponding separating wall section 11 and the corresponding undercut 14, the tool parts 31, 32 have corresponding shoulders 33, 37. The upper tool part 31 has a shoulder 33, which, in the closed state 35, protrudes axially in the direction of the lower tool part 32. The lower tool part 32 has a shoulder 37, which, in the closed state 35, protrudes axially in the direction of the upper tool part 31. The shoulders 33, 37 in each case have sides 38, which radially face one another in the closed state and which are formed to be flat and which will also be referred to as flat sides 38 hereinafter.

In the closed state 35, the flat sides 38 abut against one another. To produce the separating wall section 11 comprising the protrusion 13, the shoulder 33 of the upper tool part 31 is axially spaced apart from the lower tool part 32. Due to the distance, the hollow space 36 extends axially between the shoulder 33 and the lower tool part 32, as well as radially to the flat side 38 of the shoulder 37 of the lower tool part 32, As illustrated in FIG. 5, the protrusion 13 is thus produced, without the tool parts 31, 32 engaging behind one another. The radial extension of the protrusion 13 is thereby defined in particular by the radial extension of the shoulder 33 of the upper tool part 31.

To form the groove spiral 7 in the area of the protrusion 13 comprising the undercut 14, the shoulders 33, 37 in each case have a cross section in the shape of a circular segment. In the case of the exemplary embodiment shown in FIG. 5, the cross section of the shoulder 33 of the upper tool part 31 is smaller than the cross section of the shoulder 37 of the lower tool part 32.

The invention claimed is:

1. A flat coil carrier for a flat coil, comprising:

a carrier body for receiving a spirally wound coil wire;

the carrier body including, on an axial front side, a groove spiral configured to receive the coil wire, the groove spiral having an axially open groove opening and extending spirally on the carrier body transversely to an axial direction such that the groove spiral includes a plurality of radially consecutive groove sections;

the plurality of radially consecutive groove sections each having an axially open groove section opening of a plurality of groove section openings;

wherein the plurality of radially consecutive groove sections are each separated from one another by a common separating wall section of a plurality of separating wall sections of the carrier body;

wherein at least one of the plurality of separating wall sections protrudes from the carrier body and has at least one undercut section including a radially protruding protrusion that radially reduces a corresponding groove section opening of the plurality of groove section openings such that an undercut for the coil wire is formed in the at least one undercut section;

wherein the carrier body further includes a plurality of axial apertures disposed in a bottom of the groove spiral, at least a subset of the plurality of axial apertures disposed in radial alignment with one another; and wherein the protrusion and a corresponding axial aperture of the plurality of axial apertures are at least partially aligned with one another in the axial direction.

2. The flat coil carrier according to claim 1, wherein the at least one undercut section includes at least two undercut sections spaced apart from one another along the groove spiral via a plurality of separating sections of the groove spiral, which are free from undercuts.

3. The flat coil carrier according to claim 1, wherein:

the groove spiral has a plurality of radially extending undercut segments, in which the plurality of separating wall sections each have a respective protrusion projecting radially therefrom and forming a respective undercut; and the groove spiral has a plurality of radially extending separating segments, which are free from undercuts and which separate consecutive undercut segments of the plurality of undercut segments from one another.

4. The flat coil carrier according to claim 3, wherein:

an extension of the respective protrusion along the groove spiral increases with increasing radial distance of the respective protrusion from a radial center of the groove spiral around which the groove spiral extends spirally;

the plurality of separating segments each include a plurality of radially consecutive separating sections; and an extension along the groove spiral of each of the plurality of radially consecutive separating sections is identical.

5. The flat coil according to claim 3, wherein the subset of the plurality of axial apertures are disposed in radial alignment with one of the plurality of undercut segments.

6. The flat coil carrier according to claim 1, wherein, relative to a radial center of the groove spiral, the protrusion protrudes radially outward from the respective separating wall section.

7. A method for producing a flat coil carrier according to claim 1, comprising:

providing an injection molding tool including an upper tool part and a lower tool part, which define a hollow space in a closed state of the injection molding tool, the upper tool part and the lower tool part configured to cooperate with one another without being engaged behind such that the injection molding tool is openable via separating the upper tool part and the lower tool part from one another with a movement of the upper tool part and the lower tool part relative to one another in an axial direction;

closing the injection molding tool and injecting a plastic into the hollow space to produce the flat coil carrier; and opening the injection molding tool and removing the produced flat coil carrier.

8. The method according to claim 7, wherein:

the upper tool part has a first shoulder, which, in the closed state, protrudes toward the lower tool part;

the lower tool part has a second shoulder, which, in the closed state, protrudes toward the upper tool part;

the first shoulder has a first flat side and the second shoulder has a second flat side, the first flat side and the second flat side radially facing and abutting one another in the closed state; and the first shoulder is axially spaced apart from the lower tool part in the closed state such that the hollow space extends axially between the first shoulder and the lower tool part and extends radially to the second flat side of the second shoulder for producing a corresponding protrusion.

9. An injection molding tool for producing a flat coil carrier according to the method of claim 8.

10. The flat coil carrier according to claim 1, wherein a radial surface of the respective separating wall section, which faces toward or away from a radial center of the groove spiral, defines at least a portion of the undercut and at least a portion of a respective axial aperture of the plurality of axial apertures.

11. A flat coil, comprising a flat coil carrier and a coil wire, the coil carrier including:

a carrier body including a groove spiral;

the groove spiral disposed on an axial front side of the carrier body and having an axially open groove opening;

the groove spiral extending spirally on the carrier body such that a spiral separating wall protruding axially from the carrier body extends parallel to the groove spiral and separates radially adjacent portions of the groove spiral;

wherein the carrier body further includes a plurality of protrusions projecting radially from the spiral separating wall into the groove spiral such that a plurality of undercuts configured to receive the coil wire are defined;

wherein, relative to a radial center of the groove spiral, the plurality of protrusions project radially outward from the spiral separating wall;

wherein the coil wire is received in the groove spiral;

wherein the plurality of protrusions are arranged along the spiral separating wall longitudinally spaced apart from one another such that the spiral separating wall includes a plurality of longitudinal undercut sections and a plurality of longitudinal separating sections disposed in an alternating manner;

wherein the carrier body further includes a plurality of undercut segments and a plurality separating segments extending radially from the radial center of the groove spiral and disposed about the radial center in an alternating manner;

wherein the plurality of undercut segments are each defined by a subset of the plurality of undercut sections that are disposed in radial alignment with one another;

wherein the plurality of separating segments are each defined by a subset of the plurality of separating sections that are disposed in radial alignment with one another;

wherein the plurality of undercut segments each extend over an angular area of 60° or less;

wherein the carrier body further includes a plurality of axial apertures disposed in a bottom of the groove spiral;

wherein, in at least one of the plurality of longitudinal undercut sections, a radial surface of the spiral separating wall, which faces toward or away from the radial center of the groove spiral, defines at least a portion of a respective undercut of the plurality of undercuts and at least a portion of a respective axial aperture of the plurality of axial apertures; and wherein, in at least one of the plurality of longitudinal undercut sections, a respective protrusion of the plurality of protrusions and a respective axial aperture of the plurality of axial apertures are at least partially aligned with one another in the axial direction.

12. The flat coil according to claim 11, wherein:

the groove spiral has a rectangular basic layout having a plurality of consecutive longitudinal sides, which extend at least essentially tangentially; and the plurality of consecutive longitudinal sides transition into one another via a plurality of curved corner sections of the groove spiral.

13. The flat coil according to claim 12, wherein at least one of the plurality of consecutive longitudinal sides has a curved curvature section with a radius of curvature, which is ten times to one hundred and fifty times a radius of curvature of an adjacent curved corner section of the plurality of curved corner sections.

14. The flat coil according to claim 11, wherein the flat coil carrier includes a clamp engaged with and fixing at least one longitudinal end of the coil wire to the flat coil carrier.

15. A flat coil, comprising a coil wire and a flat coil carrier including a carrier body, wherein:

the carrier body includes:

a groove spiral extending spirally around an axis extending in an axial direction, the groove spiral disposed on an axial front side of the carrier body and having an axially open groove opening;

a spiral separating wall protruding axially from the carrier body, extending parallel to the groove spiral, and separating radially adjacent portions of the groove spiral;

at least one protrusion projecting radially from the spiral separating wall into the groove spiral such that an undercut configured to receive the coil wire is defined; and at least one axial aperture disposed in a bottom of the groove spiral, the at least one protrusion and the at least one axial aperture at least partially aligned with one another in the axial direction;

the coil wire is received in the groove spiral;

the coil wire has a diameter that is i) larger than a radial dimension of the at least one protrusion and ii) smaller than a radial dimension of a radially reduced portion of the groove opening defined between the at least one protrusion and the spiral separating wall; and a curved surface is arranged at a transition between the at least one protrusion and the spiral separating wall, the curved surface defining a corner region of the undercut and having a curvature corresponding to an outer contour of the coil wire.

16. The flat coil according to claim 15, wherein the at least one protrusion includes a plurality of protrusions arranged along the spiral separating wall longitudinally spaced apart from one another such that the spiral separating wall includes a plurality of longitudinal undercut sections and a plurality of longitudinal separating sections disposed in an alternating manner.

17. The flat coil according to claim 16, wherein:

the carrier body includes a plurality of undercut segments and a plurality separating segments extending radially from a radial center of the groove spiral and disposed about the radial center in an alternating manner;

the plurality of undercut segments are each defined by a subset of the plurality of undercut sections that are disposed in radial alignment with one another; and the plurality of separating segments are each defined by a subset of the plurality of separating sections that are disposed in radial alignment with one another.

18. The flat coil according to claim 16, wherein:

the plurality of protrusions extend along the groove spiral a respective longitudinal distance and are disposed a respective radial distance from a radial center of the groove spiral; and the respective radial distance and the respective longitudinal distance are positively correlated.

19. The flat coil according to claim 16, wherein:

the at least one axial aperture includes a plurality of axial apertures; and in at least one of the plurality of longitudinal undercut sections, a radial surface of the spiral separating wall, which faces toward or away from a radial center of the groove spiral, defines at least a portion of the undercut and at least a portion of a respective axial aperture of the plurality of axial apertures.

* * * * *